US012801495B2

(12) United States Patent
Muthiah

(10) Patent No.: US 12,801,495 B2
(45) Date of Patent: Nov. 17, 2026

(54) DATA STORAGE DEVICE AND METHOD FOR ENABLING ORTHOGONAL PARITY

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 129 days.

(21) Appl. No.: 19/009,125

(22) Filed: Jan. 3, 2025

(65) Prior Publication Data

US 2026/0195218 A1 Jul. 9, 2026

(51) Int. Cl.
*G06F 11/10* (2006.01)
*G06F 11/1446* (2026.01)

(52) U.S. Cl.
CPC ...... *G06F 11/1076* (2013.01); *G06F 11/1048* (2013.01); *G06F 11/1451* (2013.01)

(58) Field of Classification Search
None
See application file for complete search history.

(56) References Cited

U.S. PATENT DOCUMENTS 5,374,958 A * 12/1994 Yanagihara .......... H04N 19/112 375/E7.176
5,448,368 A * 9/1995 Rijckaert ............. H04N 9/8047 360/48
5,887,084 A * 3/1999 Wober .................. G06F 17/141 382/250
7,844,280 B2 * 11/2010 Anderson ............. G01S 5/0205 455/67.11
8,418,031 B1 * 4/2013 Yang .................. G06F 11/1048 714/774
12,019,917 B2 6/2024 Hahn et al.
2004/0194095 A1 * 9/2004 Lumb ................... G06F 9/4887 718/100
2005/0265607 A1 * 12/2005 Chang .................. G06F 18/256 382/224
2013/0262920 A1 * 10/2013 Jung ....................... G06F 3/061 714/6.22
2016/0179398 A1 * 6/2016 Ioannou ................ G06F 3/0608 711/103
2020/0349435 A1 * 11/2020 Gupta .................... G06N 20/00

OTHER PUBLICATIONS

"NVIDIA GPUDirect"; NVIDIA GPUDirect product page; downloaded from the Internet at https://developer.nvidia.com/gpudirect on Jan. 2, 2025; NVIDIA Developer; NVIDIA Corporation, 2025; 5 pages.

* cited by examiner

*Primary Examiner* — Guerrier Merant
(74) *Attorney, Agent, or Firm* — Crowell & Moring LLP

(57) ABSTRACT

A data storage device is described that can manage parity in a way that can be beneficial for error-recovery and can also enhance the compute quality of service (QoS) of the data storage device. In one example, a controller of the data storage device is configured to transform data to an orthogonal domain and store it as parity data. The parity data can be stored either fully or partially based on whether the controller wants to maintain lossless parity or approximate parity to create redundancy in another dimension for the stored data to recover from a memory loss, as well as to enable ready-to-compute transformed data. This decision can be based on, for example, a desired write-amplification factor or compute QoS.

20 Claims, 8 Drawing Sheets

DATA STORAGE DEVICE AND METHOD FOR ENABLING ORTHOGONAL PARITY

BACKGROUND

Parity data can be used for error detection and correction to ensure data integrity through redundancy. A data storage device can build different types of data redundancy according to underlying memory health and the scope of marketed features of the data storage device. A linear exclusive- or (XOR) operation is a relatively-simple design of parity management that generates one wordline of parity per an N wordline metapage. Different parity ratios define the efficiency and fault tolerance of the system. As an example, a five-disk RAID-5 system can have a 20% parity ratio, a six-disk RAID-6 system can have a 33% parity ratio, and a RAID-1 mirroring system can have a 100% parity ratio.

Also, data center solid-state drives (SSDs) are widely used to access data for computational purposes. If the accessing core is such that it operates on a frequency domain (owing to efficiency in that domain), the data is typically transformed by that engine. Several media processing algorithms and machine-learning applications are optimal when they deal with frequency-transformed data. The orthogonal transformation (to the frequency domain) ensures that the original function or signal can be uniquely decomposed into a sum of orthogonal basis functions (sines, cosines, or complex exponentials) and can be reconstructed from these components. Data in the frequency domain is handy for most computations (e.g., cross-correlation, feature enhancement, and pattern recognition algorithms).

DETAILED DESCRIPTION

The following embodiments generally relate to a data storage device and method for enabling orthogonal parity. In one embodiment, a data storage device is provided comprising a memory and one or more processors. The one or more processors, individually or in combination, are configured to: encode data received from a host; store the encoded data in a first location in the memory; transform the data received from the host; encode the transformed data; generate parity data based on the encoded transformed data and the encoded data; store the parity data in a second location in the memory; and store a data structure in a third location in the memory, wherein the data structure associates the parity data stored in the second location in the memory with the encoded data stored in the first location in the memory.

In another embodiment, a method is provided that is performed in a data storage device comprising a memory. The method comprises: receiving data from a host; storing the data in the memory; transforming the data to an orthogonal domain; and storing the transformed data as parity data in the memory, wherein the parity data is stored either fully or partially in response to a determination to maintain lossless parity or approximate parity, respectively.

In yet another embodiment, a data storage device is provided comprising: a memory; means for leveraging transformed data as a parity backup during a failure of the memory; and means for trimming transformed data according to a design requirement.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
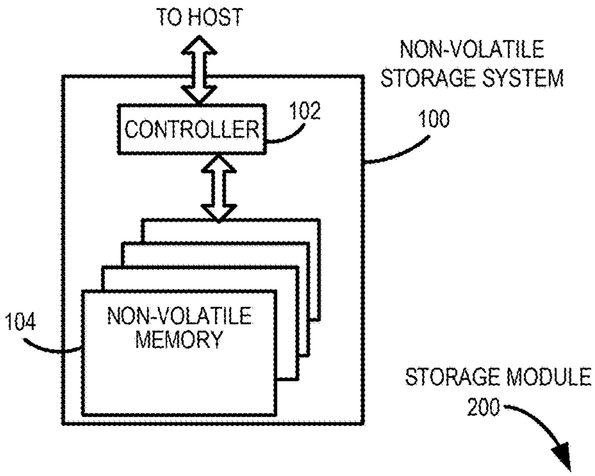
FIG. 1A is a block diagram of a data storage device of an embodiment.
Figure 1B:
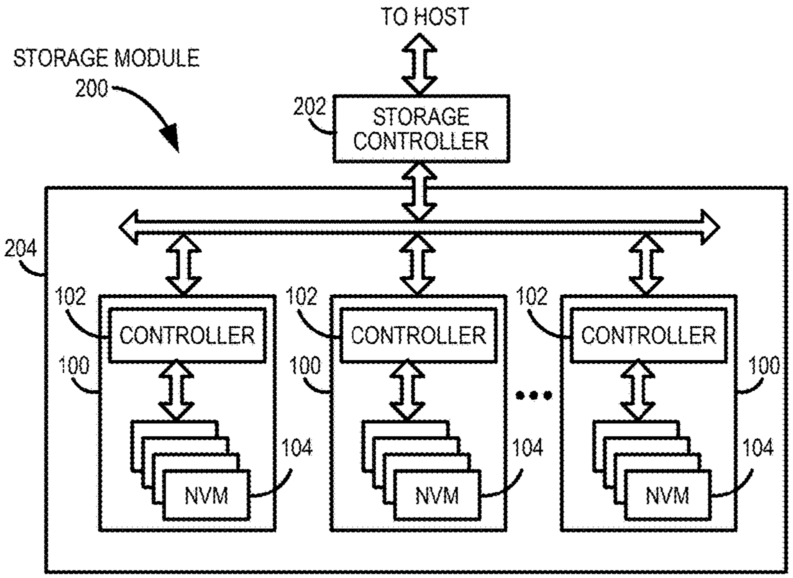
FIG. 1B is a block diagram illustrating a storage module of an embodiment.
Figure 1C:
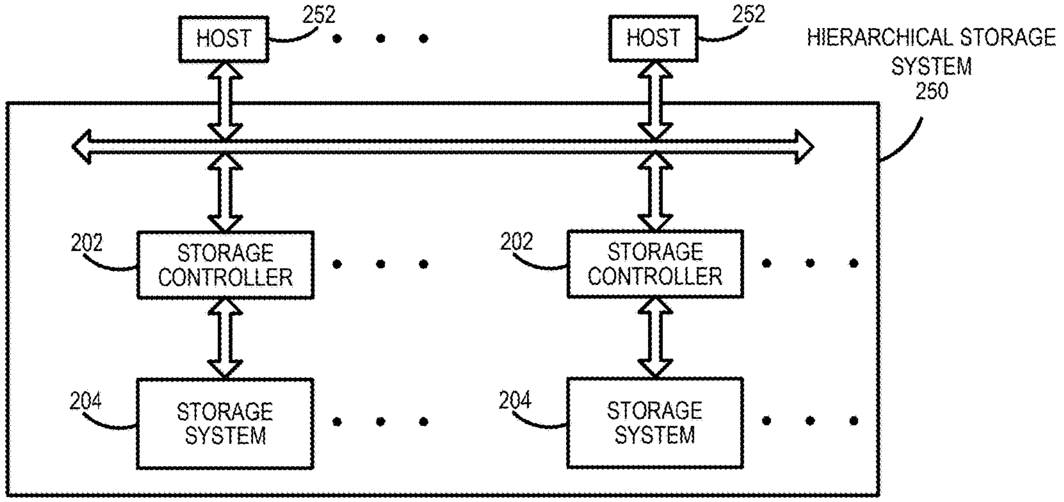
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
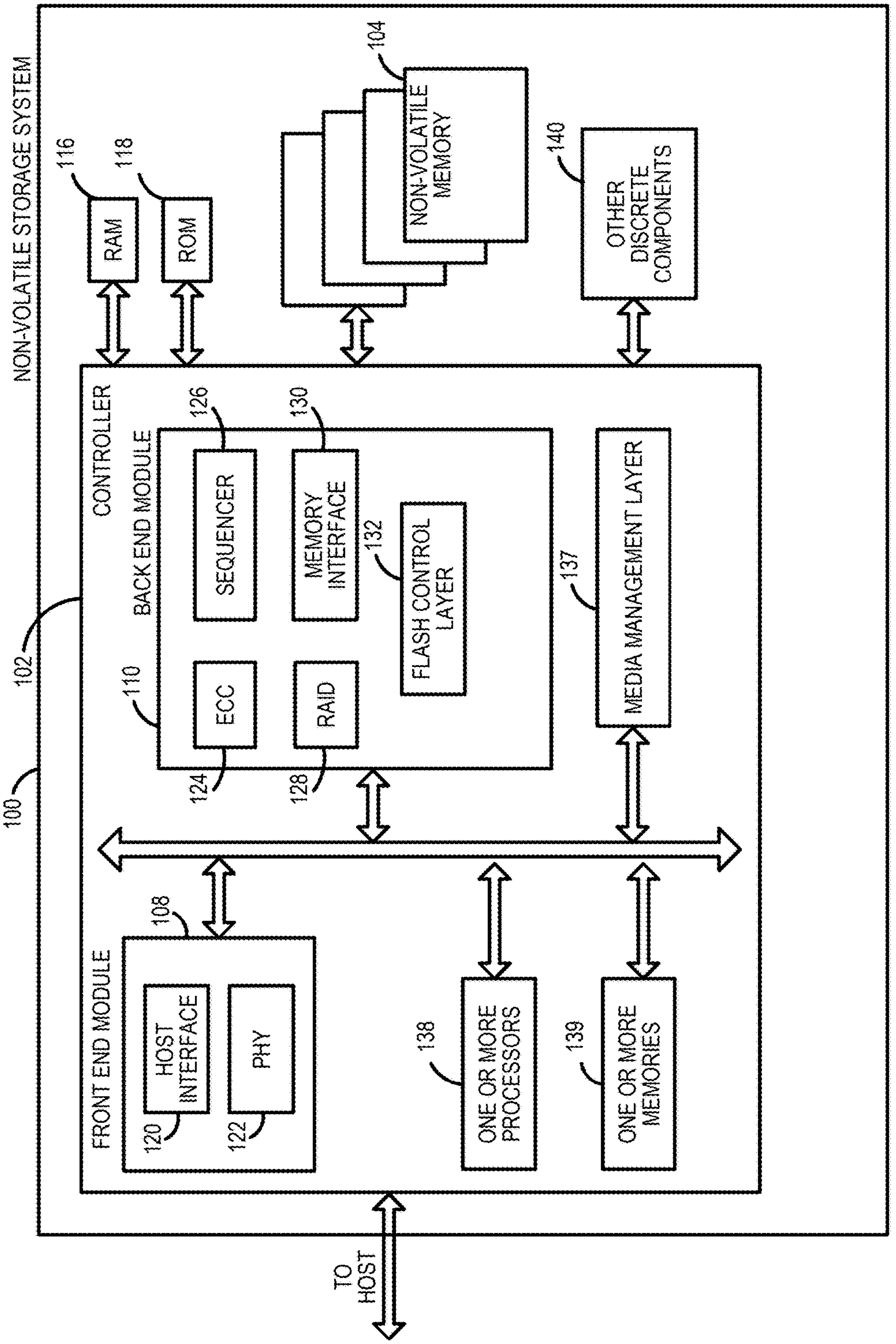
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
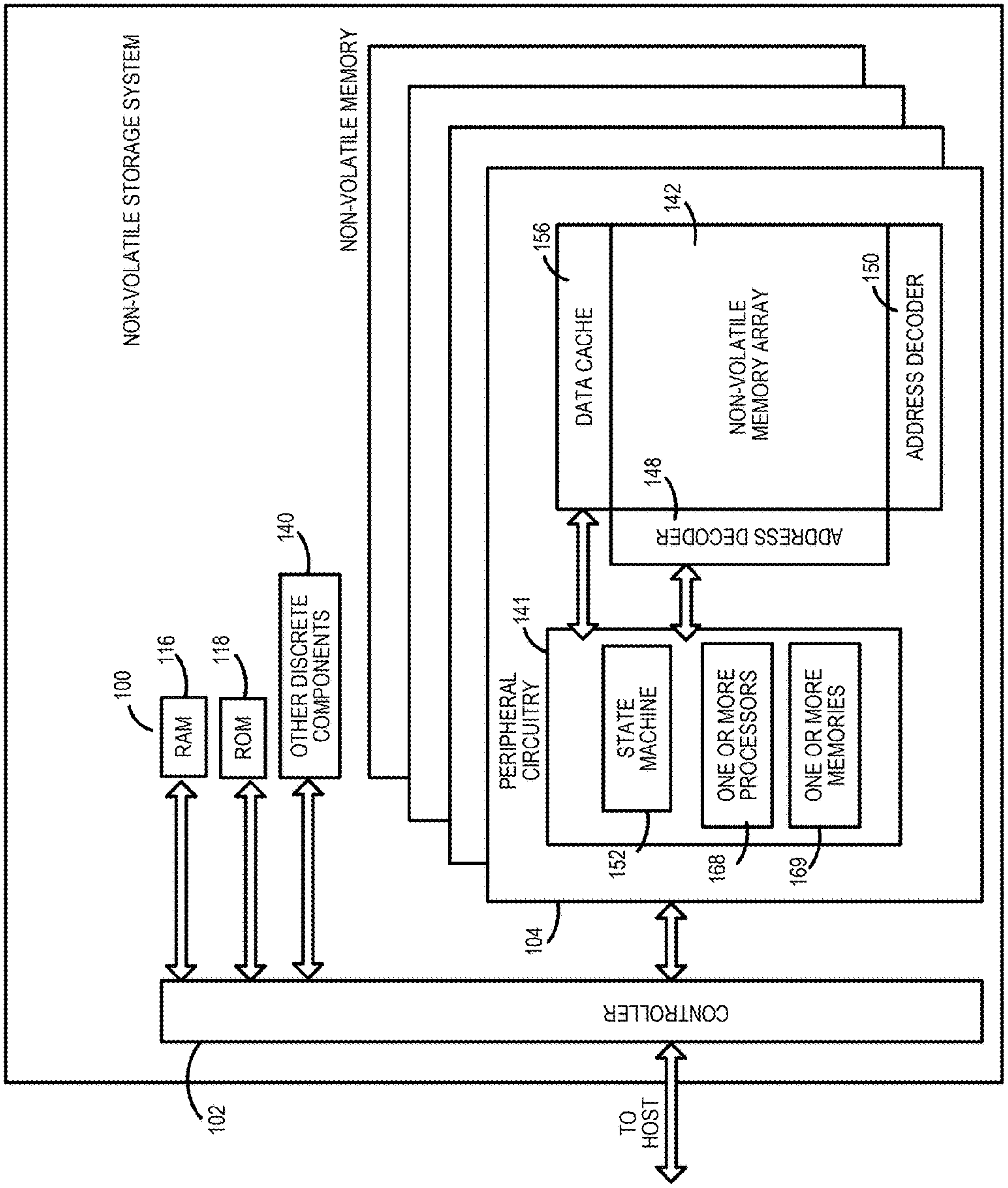
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
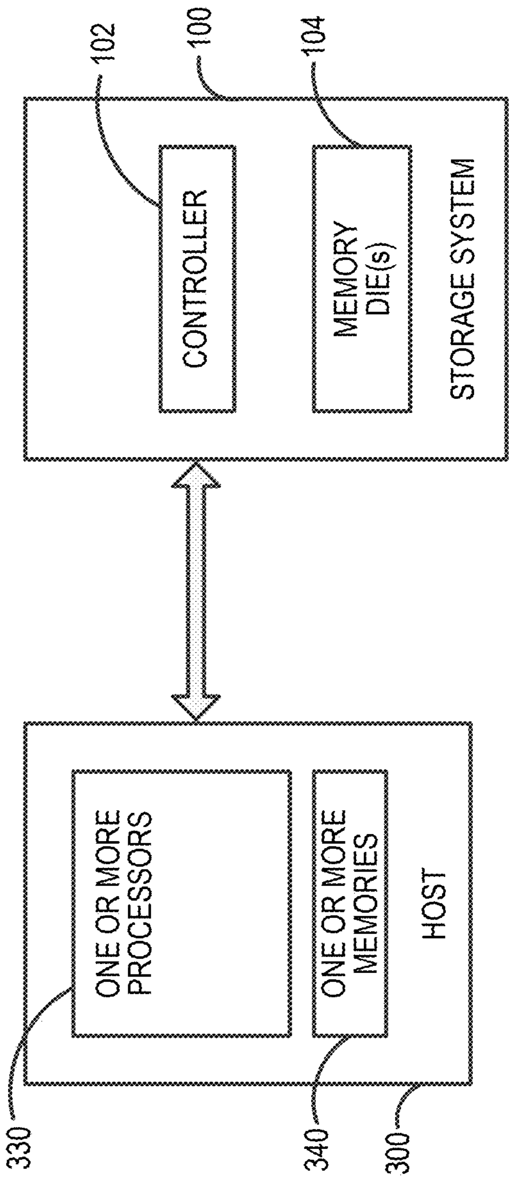
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
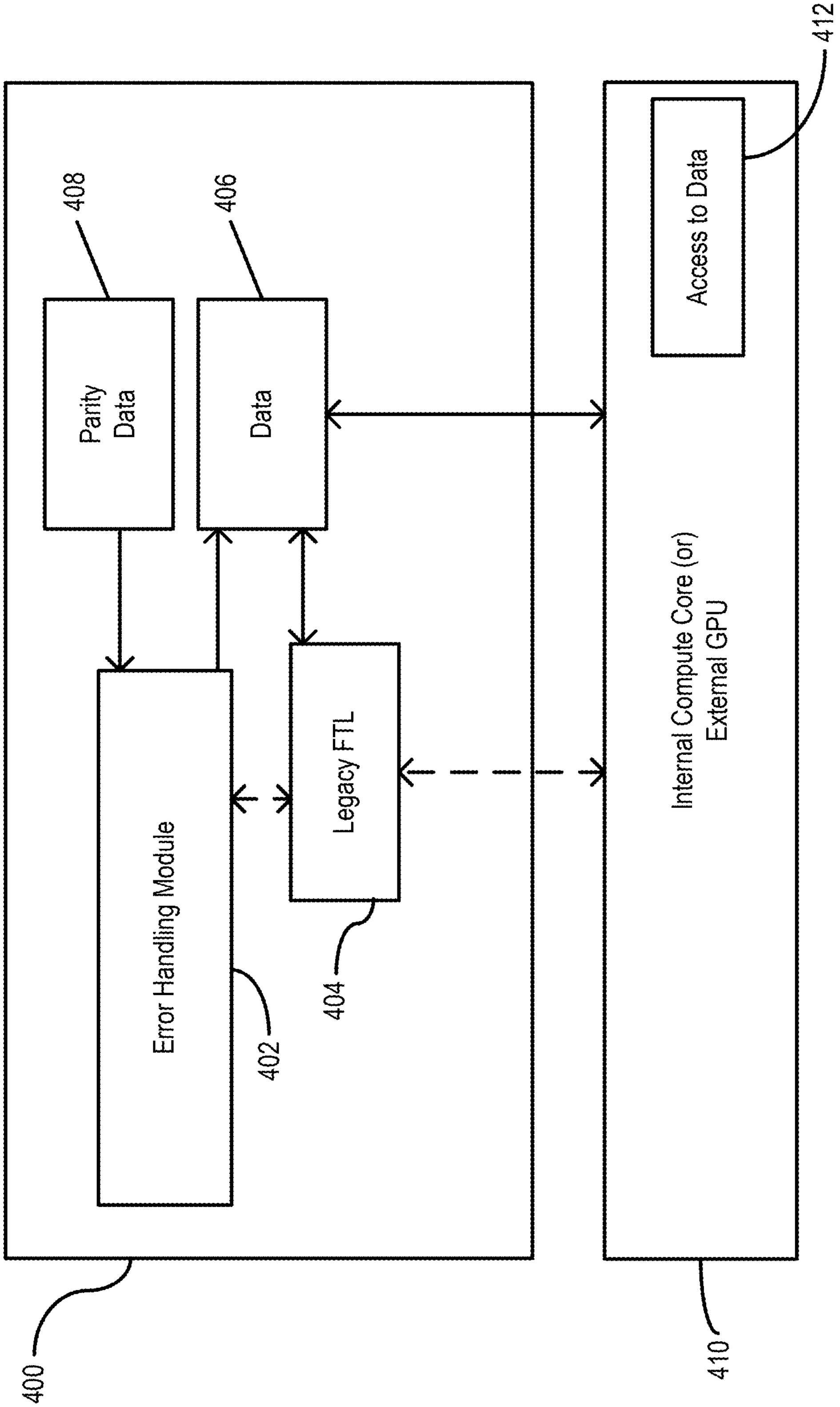
FIG. 4 is a block diagram of a data storage device of an embodiment.

FIG. 4 is a block diagram of an example data storage device that can be used for error detection and correction of data. As shown in FIG. 4, in this example, the data storage device comprises a controller 400 that is in communication with an internal compute core or an external graphics processing unit (GPU) 410. (One or both of these components can comprise one or more processors, as explained above.) The controller 400 in this example comprises an error handling module 402 and a legacy flash translation layer (FTL) 404, and the internal compute core/external GPU 410 comprises a module 412 configured to provide access to data 406 stored in the data storage device's memory based on address information provided by the controller's FTL 404. The error handling module 402 is configured to detect and handle errors in the data 406 based on parity information (data) 406 associated with the data 406.

As mentioned above, parity data can be used for error detection and correction to ensure data integrity through redundancy. A data storage device can build different types of data redundancy according to underlying memory health and the scope of marketed features of the data storage device. A linear exclusive- or (XOR) operation is a relatively-simple design of parity management that generates one wordline of parity per an N wordline metapage. Different parity ratios define the efficiency and fault tolerance of the system. As an example, a five-disk RAID-5 system can have a 20% parity ratio, a six-disk RAID-6 system can have a 33% parity ratio, and a RAID-1 mirroring system can have a 100% parity ratio.

Also, data center solid-state drives (SSDs) are widely used to access data for computational purposes. If the accessing core is such that it operates on a frequency domain (owing to efficiency in that domain), the data is typically transformed by that engine. Several media processing algorithms and machine-learning applications are optimal when they deal with frequency-transformed data. The orthogonal transformation (to the frequency domain) ensures that the original function or signal can be uniquely decomposed into a sum of orthogonal basis functions (sines, cosines, or complex exponentials) and can be reconstructed from these components. Data in the frequency domain is handy for most computations (e.g., cross-correlation, feature enhancement, and pattern recognition algorithms).

The following embodiments describe how a data storage device can manage parity in a way that can be beneficial for error-recovery and can also enhance the compute quality of service (QoS) of the data storage device. In one embodiment, the controller 102 of the data storage device 100 is configured to transform data to an orthogonal domain (such as discrete cosine transform (DCT)) and store it as parity data in the non-volatile memory 104, either fully (all frequency points) or partially (only the dense low-frequency portions) based on whether the controller 102 wants to maintain lossless parity or approximate parity to create redundancy in another dimension for the stored data to recover from a memory loss, as well as to enable ready-to-compute transformed data. In some cases, this decision is based on a flash write-amplification factor, whereas, in other cases, this decision is based on a compute QoS associated with the transformed data. Lossless parity can enable the data storage device 100 to perform a full-fledged recovery from transformed data on a memory (e.g., NAND) error. The approximate parity can be for those application use cases where partial data recovery from the transformed parity is sufficient. In general, transformation itself allows data compression, thereby enabling the data storage device 100 to maintain a system threshold for a parity ratio.

In one embodiment, the controller 102 is configured to manage lossy parity by discarding portions of the transformed data, and the amount of discard is based on a system write-amplification factor for parity management and/or the compute QoS related to the approximation of the transformed data. It may be noted that inverse transformation of the transformed data that has been partially discarded results in approximation of the actual data.

In a networked storage system where RAID is managed across multiple data storage devices, the transformed data can be stored in another data storage device as a parity, either fully or partially after discarding portions of the transformed data. In this way, when one data storage device (e.g., an SSD) hits a NAND failure, it is configured to fetch the transformed data from another SSD (the RAID SSD that stores the parity) and perform inverse transformation on such data to recover from the NAND failure. The type of recovery, absolute or approximate, is based on the amount of stored parity. U.S. Pat. No. 12,019,917, which is hereby incorporated by reference, discloses embodiments related to using one SSD for managing parity and a RAID for other SSDs. The embodiments presented herein can be used independently from those embodiments and can work not only at the individual device level but also can be advantageously applied in conjunction with the embodiments in U.S. Pat. No. 12,019,917. Since machine-learning applications and GPU systems are more associated with a networked environment that need transformed data for quick processing, this form of the method can be handy.

A master SSD in a network storage may be configured to evaluate the type of data and the amount of parity that needs to be generated and discarded in the orthogonal domain for that data type to meet the compute quality, as well as the write amplification factor (WAF) in the storage system. For example, for one data set, the orthogonal parity can be stored as it is, and, for another data set, only a portion of it may be stored after discarding the rest of it. This is in addition to the decision of whether the data should have regular or the proposed orthogonal parity.

One advantage in creating orthogonal redundancy in another dimension is that either of them (the data and the transformed parity) can be used for computation based on an application requirement without any extra latency (ready-to-compute) when it is time to apply the data. As an example, when an image is stored in the data storage device, say as an object, then the controller 102 of this embodiment may discrete cosine transform (DCT) the image, additionally store the frequency components as parity data such that it can use the time domain signal for some set of computations and host retrieval requests, and use the transformed parity data (frequency domain signal) for the rest of the set of computations that include cross-correlation, feature enhancement, and pattern recognition algorithms.

In a use case, a compute core in the data storage device 100, or a GPU external to the data storage device 100, may directly seek the parity data (the transformed data, and not the actual host data) when it determines that the frequency domain signal is useful in a context. In this case, the GPU system is configured to evaluate if the data storage device 100 can provide transformed data and if so, request the transformed data instead of the actual data if the use case demands so. Since the machine-learning models associated with speech recognition and image classification applications can achieve better performance by incorporating frequency domain signals as compared to time domain signals, this method can improve the inference QoS of such machine-learning systems.

These embodiments can be advantageously applied to a GPUDirect storage system where the external GPU has a direct access path to the data in the NVMe data storage device.

Also, in one embodiment, the controller 102 can use the transformed signal to recover loss of data in the data storage device 100. More specifically, when the controller 102 detects that logical data is lost due to a NAND error, the controller 102 can determine if it has a transformed equivalent or approximate data. If it does, the controller 102 can re-transform the signal back to the time domain to get the corresponding equivalent or approximate data. Likewise, both aspects (parity as well as a compute-ready signal in the frequency domain) are met for the data with the proposed type of storage, which is not possible with legacy redundancy mechanisms. In some cases, the logical data is block-based media data, such as a video frame or an image. In some cases, the data is value data associated with a key in a key-value (KV) data storage device. In some cases, the data is an object in an object storage system.

Parity Management in a Data Augmentation System

The embodiments presented herein can be used in a data storage device that is configured to perform in-house data augmentation for artificial intelligence (AI)/machine learning (ML) training. Augmentation refers to the mechanism where the data is modified according to a predetermined protocol to expand the data set. For example, an image of a cat can be rotated or a bit in the image can be flipped, which still results in an image of the cat but is a different from the original image of the cat. This augmentation can be performed based on metadata primarily to expand the size of the data set by generating modified versions of the data to enable efficient training in machine-learning systems. In such systems, these embodiments can be applied to recover or retrieve a fundamental data set associated with a NAND error by using the same augmentation metadata and performing a reverse-augmentation on the augmented data set. In this method, the controller 102 can store the augmentation metadata and apply reverse augmentation to retrieve the fundamental data from errors. Likewise, multiple recovery systems can be created using this embodiment. Further, if the augmentation is part of the system requirement, there is no write amplification with the parity management of this embodiment.

With efficient Fast Fourier Transform (FFT) hardware engines available for such transformations in modern systems, parity and ready-to-compute data can be managed for suitable and/or specific data. In a related method, the controller 102 may decide the parity management based on the type of data. In this case, the controller 102 can execute the proposed transformation only when it determines that the transformed data would be useful in at least some computations at some point in the transformed domain. If not, the controller 102 can create classic parity in the system to save the one-time computation costs associated with this method. The controller 102 can also take such decision based on the workload associated with the FFT engines. The error handling module in the data storage device 100 can have re-transformation capabilities with assistance from the FFT engine to recover any NAND errors using the re-transformation of this embodiment.

As background of FFT, the output of the FFT is a complex number array. The magnitude of these complex numbers represents the amplitude of each frequency component, and the phase represents the shift of the sine wave at that frequency. The input data can be in a format suitable for FFT, typically a sequence of real or complex numbers. As mentioned above, the input data can be, for example, a key-value, an object, or an image/video frame associated with a logical block address.

It may be noted that any data that allows the system to recover the primary data can be considered parity data. Typically, a 4 KB unit of host data (a fragment) is taken, encoded by an error correction code (ECC) engine, parity generated, and attached to the fragment to recover any bit flips in its lifetime. One embodiment leverages the industry compute trends to use the transformed data as parity, since the inverse transformation does give the host data back. Thus, a normal inverse transformation module can be used to recover the data, and other designs related to ECC decoders may not be required. The transformed data is the parity data, and typical ECC may be applied to that data on par with any other host data for legacy storage in the memory 104. In practice, the Fast Fourier Transform (FFT) and Inverse FFT (IFFT) are used to efficiently compute the DFT and IDFT for digital signals.

For discrete signals, the following IDFT equation can be used:

$$x[n] = \frac{1}{N}\sum_{k=0}^{N-1} X[k]e^{j2\pi kn/N}$$

Where:

x [n] is the time-domain signal

X [k] is the frequency-domain representation

N is the number of samples k indexes the frequency components.

The Fourier Transform converts an image into the frequency domain, representing the image as a sum of sine and cosine functions of varying frequencies. It may be noted that various applications analyze the frequency components to filter out unwanted frequencies or to focus on specific frequency bands. This is a very important consideration associated with any transformation, and the data storage device 100 of this embodiment can leverage this in parity creation as well as data management, as described in the following example use cases.

Pure Transformation

If the host 300 does not have a pre-determined requirement of the data, a generic frequency transformation can be done in the data storage device 100. In this case, all the frequency components can be stored in the data storage device 100. This data can be used for computation. This would be a direct value without any parity consideration. However, the pure transformation also supports absolute parity. During a NAND error, these components can be used to recover the time domain data, which would be exact since FFT works in both directions. For example, a frequency domain data set can be used in image compression algorithms. While lossless compression can fall in the absolute parity category, and the storage utilization can be 50% and mostly useful in mirror-RAID-type parity management.

Figure 5:
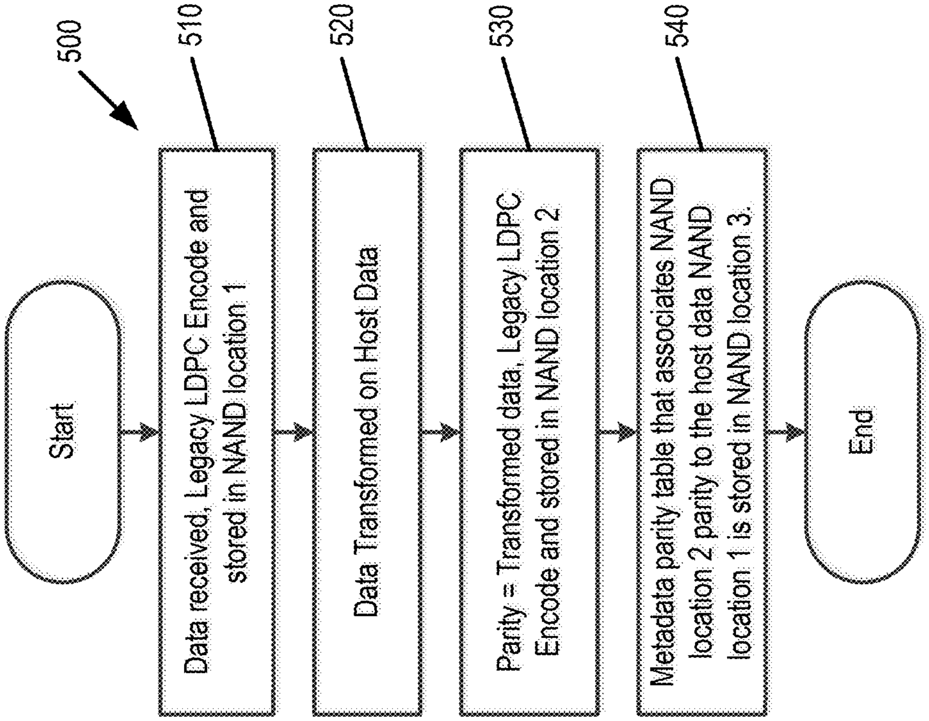
FIG. 5 is a flow chart of a method of an embodiment illustrating use of a write or relocation path for absolute parity.

Turning again to the drawings, FIG. 5 is a flow chart 500 of a method of an embodiment illustrating use of a write or relocation path for absolute parity. As shown in FIG. 5, in this method, the controller 102 receives data from the host 300, encodes the data using a low-density parity code (LDPC), and stores the encoded data in a first location in the memory 104 (510). After the host data (i.e., the un-encoded data) is transformed (520), the controller 102 generates parity bits based on the transformed data and the LDPC-encoded data and then stores the parity bits in a second location in the memory 104 (530). Finally, the controller 102 stores a metadata parity data structure (e.g., table) in a third location in the memory 104, where the metadata parity data structure associates the second location in the memory 104 with the host data stored in the first location in the memory 104 (540).

Figure 6:
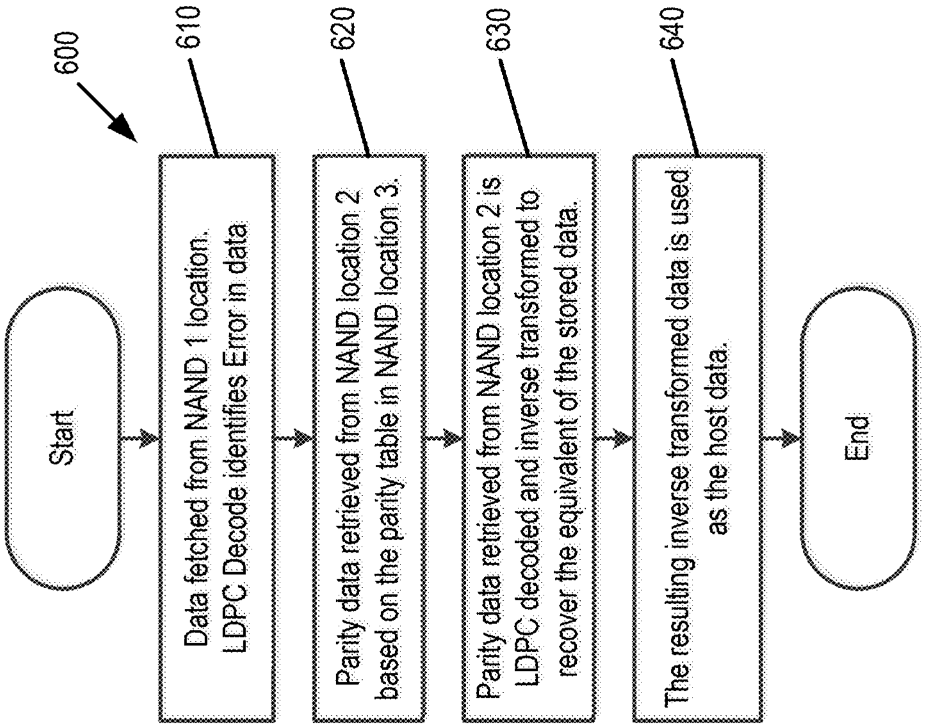
FIG. 6 is a flow chart of a method of an embodiment illustrating use of a retrieval or error recovery path with absolute parity.

FIG. 6 is a flow chart 600 of a method of an embodiment illustrating use of a retrieval or error recovery path with absolute parity. As shown in FIG. 6, in this method, the controller 102 retrieves data from the first location in the memory 104 and identifies an error in the data (610). The controller 102 then retrieves the parity data (bits) from the second location in the memory 104 based on the information in the parity table stored in the third location in the memory 104 (620). The controller 102 then LDPC decodes the parity data and performs an inverse transformation to recover the equivalent of the stored data (630). Finally, the resulting inverse transformed data is used as the host data (640).

Image Noise Reduction

Removing high-frequency components (associated with noise) can smooth an image. Using these embodiments, if the transformed data is stored as parity in a storage system, an inverse transformation during a NAND error can provide similar data in the time domain but whose "high frequency" is lost since it was filtered owing to application requirements. Thus, the write amplification factor (WAF) is reduced due to discarding a few of the frequency components.

However, the parity is approximate but good enough for recovering the base data. The reduction in the WAF is directly proportional to the approximation these applications are looking for. Thus, a data storage device using this embodiment may also have a system design that trades off WAF and an approximation of data during a recovery mode.

Image Edge Detection

High-pass filters that preserve high frequencies are used for edge detection. Using these embodiments, if this transformed data is stored as parity in a storage system, an inverse transformation during a NAND error can provide similar data in the time domain but whose "low frequency" is lost. Again, WAF is less, and the parity is approximate but good enough for recovering the base data.

Figure 7:
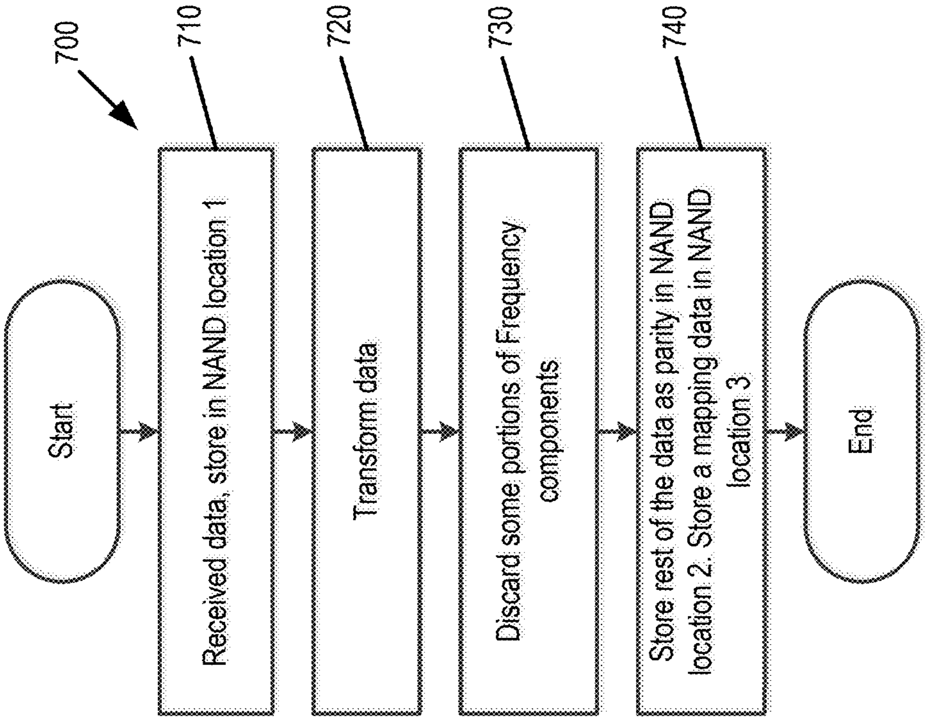
FIG. 7 is a flow chart of a method of an embodiment illustrating use of a write or relocation path for absolute parity.

Turning again to the drawings, FIG. 7 is a flow chart 700 of a method of an embodiment illustrating use of a write or relocation path for absolute parity. As shown in FIG. 7, in this method, the controller 102 receives data from the host 300 and stores the data in a first location in the memory 104 (710). After the data is transformed (720), the controller 102 discards some portions of the frequency components (730). Finally, the controller 102 stores the rest of the data as parity in a second location in the memory 104 and stores mapping data in a third location in the memory 104 (740).

Figure 8:
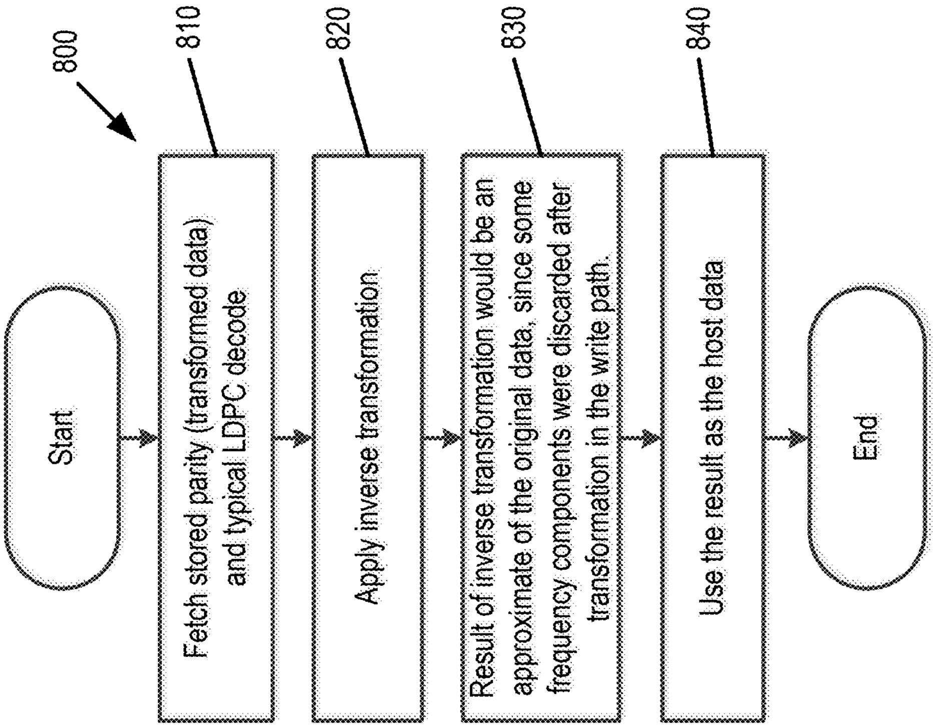
FIG. 8 is a flow chart of a method of an embodiment illustrating use of a retrieval or error recovery path with absolute parity.

FIG. 8 is a flow chart 800 of a method of an embodiment illustrating use of a retrieval or error recovery path with absolute parity. As shown in FIG. 8, in this method, the controller 102 retrieves and decodes stored parity (transformed data) (810). The controller 102 then applies an inverse transformation (820). The result of the inverse transformation would be an approximation of the original data since some frequency components were discarded after transformation in the write path (830). Finally, the controller 102 uses the result as the host data (840).

Transformed Parity Storage Management

It may be noted that the frequency-transformed data that is created is just another data set for the data storage device 100 (e.g., equal to that of what the host 300 provides). Hence, that data can be stored in the memory 104 of the data storage device 100 as parity using legacy principles. For example, the transformed data (e.g., real and complex numbers) can be consolidated at a 4 K Flash fragment boundary and stored in memory 104. In one implementation, the controller 102 can track a metadata or a parity table associating the parity fragments (transformed) to the host data (time domain). They can be managed independently, and, in some cases, the controller 102 can discard the transformed data at a later point when it does not see enough value in computations. Likewise, multiple system use cases and handling can be defined.

The LDPC decode and the encode in the parity path can be simple legacy workflows applicable today for classic parity, as the above flow charts show. The transformed data can be just another data set for the data storage device 100 (e.g., a set of real and complex coefficients), and no special encode/decode may be required because the data set is in the frequency domain.

A simple inverse transformation (IFFT) can be used to inverse transform a parity to obtain the host data during a memory error. Whenever there is a memory error on the data, the parity table can be used to determine the transformed Flash fragment, retrieve it from the memory 104 and LDPC decode is as part of typical retrieval, and apply an inverse transform operation to the data. The resulting data can be used as a way of recovery.

Figure 9:
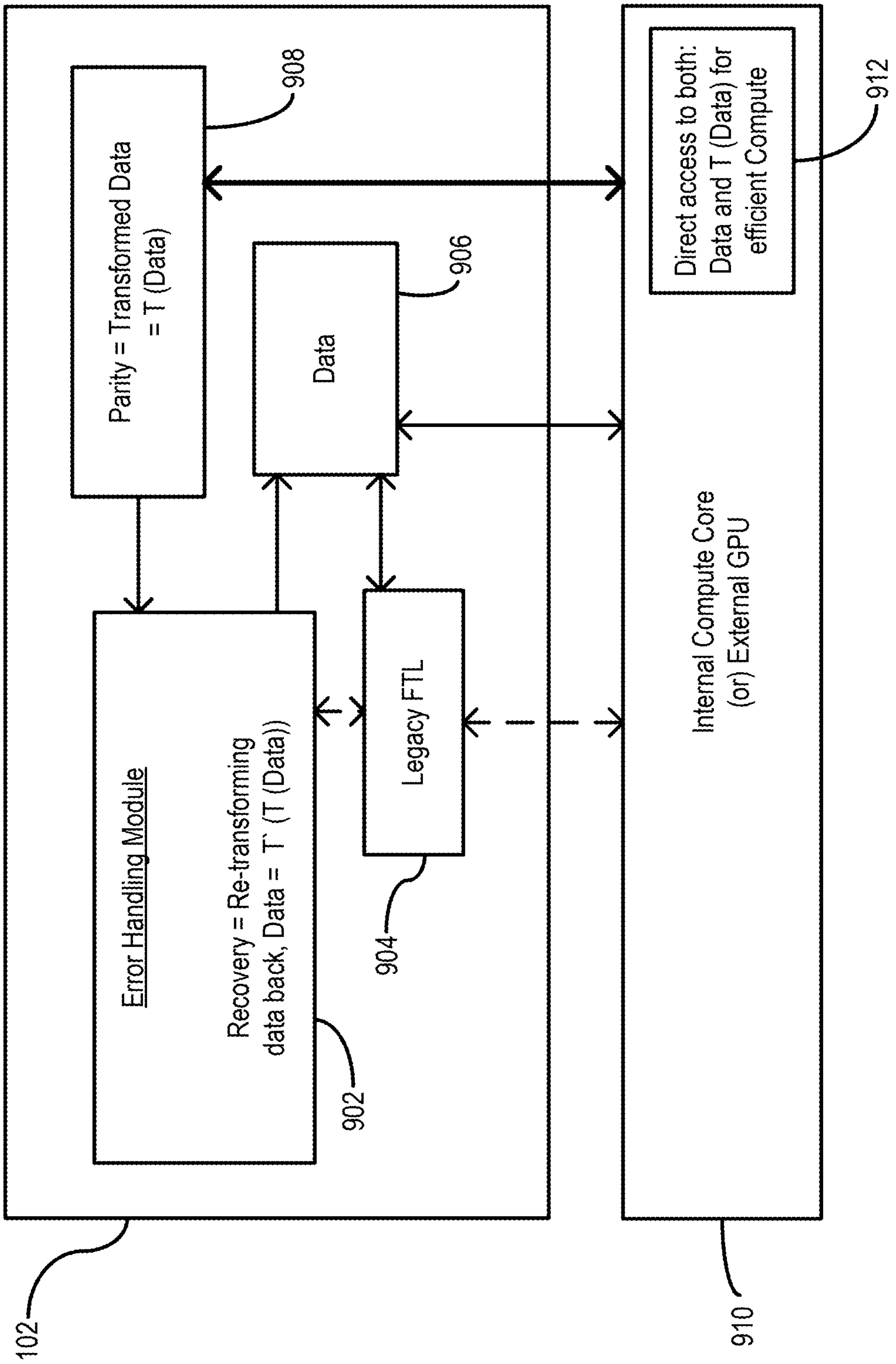
FIG. 9 is a block diagram of a data storage device of an embodiment.

Turning again to the drawings, FIG. 9 is a block diagram of an example data storage device that can be used for error detection and correction of data. As shown in FIG. 9, in this example, the data storage device comprises the controller 102 mentioned above, which is in communication with an internal compute core or an external graphics processing unit (GPU) 510. The controller 102 in this example comprises an error handling module 502 and a legacy flash translation layer (FTL) 504, and the internal compute core/external GPU 510 comprises a module 512 configured to provide direct access to both data 906 and T (Data) stored in the data storage device's memory 104 for efficient compute.

In some cases, the controller 102 can store only a portion of the transformed data wherein it may cut off high-frequency components above a threshold precision to save memory space to minimize write application in the memory 104 at the cost of computation precision, which is sometimes referred to herein as lossy or approximate parity. In this method, the controller 102 can only make an approximate recovery from the redundant data based on the set threshold when it faces NAND errors. Likewise, the controller 102 can evaluate multiple system trade-offs based on the nature of data. As an example, when the controller 102 determines that the data set is associated with a record (and not media), such as a medical record, it can take the legacy approach of redundancy in the same domain or maintain a fully-orthogonal transformation for complete recovery from redundancy if approximations in records do not make a good use case.

In some cases, the orthogonal parity is stored in addition to the classic parity to enable high-compute QoS, such that on a NAND error, the controller 102 can choose to recover the data from either of the parity or the orthogonal parity based on system parameters. The orthogonal transformation ensures that the original function or signal can be uniquely decomposed into a sum of orthogonal basis functions (sines, cosines, or complex exponentials) and can be perfectly reconstructed from these components.

In summary, some of the above embodiments can be used to leverage transformed data as a parity backup during NAND failures, while others embodiments can be used to trim the transformed data according to the underlying FTL design of write-application, compute approximation, computation bandwidth and flash recovery mode. There are many advantages associated with these embodiments. For example, managing parity as described above can be beneficial not only for error-recovery but also for enhancing compute QoS of a data storage device.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory; and one or more processors, individually or in combination, configured to:

encode data received from a host with error correction code (ECC) parity generated for the data;

store the encoded data in a first location in the memory;

transform the data received from the host, wherein the data that is transformed is in an unencoded form;

generate ECC parity for the transformed data;

store the ECC parity for the transformed data in a second location in the memory; and store a data structure in a third location in the memory, wherein the data structure associates the ECC parity for the transformed data stored in the second location in the memory with the encoded data stored in the first location in the memory such that the ECC parity for the transformed data is used instead of the ECC parity for the encoded data in response to an error in the encoded data.

2. The data storage device of claim 1, wherein the one or more processors, individually or in combination, are further configured to:

retrieve the encoded data from the first location in the memory;

identify the error in the encoded data;

retrieve the ECC parity for the transformed data from the second location in the memory based on the information in the data structure stored in the third location in the memory;

decode the ECC parity for the transformed data; and perform an inverse transformation on the decoded ECC parity for the transformed data to recover an equivalent of the encoded data.

3. The data storage device of claim 1, wherein the ECC parity comprises a low-density parity code (LDPC).

4. The data storage device of claim 1, wherein the data is transformed to an orthogonal domain.

5. The data storage device of claim 1, wherein the one or more processors, individually or in combination, are further configured to determine how much of the ECC parity for the transformed data to store based on a write-amplification factor.

6. The data storage device of claim 1, wherein the one or more processors, individually or in combination, are further configured to determine how much of the ECC parity for the transformed data to store based on a compute quality of service.

7. The data storage device of claim 1, wherein the one or more processors, individually or in combination, are further configured to create an expanded data set for augmentation for artificial intelligence (AI)/machine learning (ML) training.

8. The data storage device of claim 1, wherein the data received from the host comprises a key-value.

9. The data storage device of claim 1, wherein the data received from the host comprises an object.

10. The data storage device of claim 1, wherein the data received from the host comprises an image/video frame associated with a logical block address.

11. The data storage device of claim 1, wherein at least one processor of the one or more processors is part of a controller, and wherein at least one other processor of the one or more processors is part of an internal compute core or a graphics processing unit (GPU).

12. The data storage device of claim 1, wherein the first location of the memory is located in a first networked storage device and the second location of the memory is located in a second networked storage device.

13. In a data storage device comprising a memory, a method comprising:

encoding data received from a host with error correction code (ECC) parity generated for the data;

storing the encoded data in a first location in the memory;

transforming the data received from the host to an orthogonal domain, wherein the data that is transformed is in an unencoded form;

generating ECC parity for transformed data;

storing the ECC parity for the transformed data in a second location in the memory; and storing a data structure in a third location in the memory, wherein the data structure associates the ECC parity for the transformed data stored in the second location in the memory with the encoded data stored in the first location in the memory such that the ECC parity for the transformed data is used instead of the ECC parity for the encoded data in response to an error in the encoded data.

14. The method of claim 13, further comprising:

decoding the ECC parity for the transformed data, and performing an inverse transformation on the decoded ECC parity for the transformed data to recover an equivalent of the data received from the host.

15. The method of claim 13, wherein which frequency components of the transformed data are stored is determined by a requirement of an image noise reduction application.

16. The method of claim 13, wherein which frequency components of the transformed data are stored is determined by a requirement of an image edge detection application.

17. The method of claim 13, wherein the data received from the host comprises a key-value, an object, or an image/video frame.

18. The method of claim 13, wherein the determination is based on a write-amplification factor.

19. The method of claim 13, wherein the determination is based on a compute quality of service.

20. A data storage device comprising:

a memory; and means for:

encoding data received from a host with error correction code (ECC) parity generated for the data;

storing the encoded data in a first location in the memory;

transforming the data received from the host, wherein the data that is transformed is in an unencoded form;

generating ECC parity for transformed data;

storing the ECC parity for the transformed data in a second location in the memory; and store a data structure in a third location in the memory, wherein the data structure associates the ECC parity for the transformed data stored in the second location in the memory with the encoded data stored in the first location in the memory such that the ECC parity for the transformed data is used instead of the ECC parity for the encoded data in response to an error in the encoded data.

* * * * *